(12) United States Patent
Kympers et al.

(10) Patent No.: US 10,713,267 B1
(45) Date of Patent: Jul. 14, 2020

(54) NETWORK ANALYSIS SYSTEM

(71) Applicant: Microsoft Technology Licensing, LLC, Redmond, WA (US)

(72) Inventors: Henri Kympers, Mountain View, CA (US); Luke Whelan, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 513 days.

(21) Appl. No.: 15/360,507

(22) Filed: Nov. 23, 2016

Related U.S. Application Data (60) Provisional application No. 62/382,114, filed on Aug. 31, 2016.

(51) Int. Cl.
*G06F 7/00* (2006.01)
*G06F 16/00* (2019.01)
*G06F 16/248* (2019.01)
*H04L 29/08* (2006.01)
*G06F 16/2457* (2019.01)

(52) U.S. Cl.
CPC ...... *G06F 16/248* (2019.01); *G06F 16/24578* (2019.01); *H04L 67/18* (2013.01)

(58) Field of Classification Search
CPC combination set(s) only.
See application file for complete search history.

(56) References Cited

U.S. PATENT DOCUMENTS

| | | | |
|---|---|---|---|
| 2010/0241580 A1* | 9/2010 | Schleier-Smith | G06Q 30/02 705/319 |
| 2011/0246574 A1* | 10/2011 | Lento | G06Q 10/10 709/204 |
| 2012/0203846 A1* | 8/2012 | Hull | G06Q 10/107 709/206 |
| 2015/0026083 A1* | 1/2015 | Paliwal | G06Q 50/01 705/319 |
| 2015/0248647 A1* | 9/2015 | Goel | G06Q 10/1053 705/321 |

* cited by examiner

*Primary Examiner* — Tuan A Pham
(74) *Attorney, Agent, or Firm* — Schwegman Lundberg & Woessner, P.A.

(57) ABSTRACT

Described are methods and systems to identify missing connections, facilitate establishing new connections by identifying an intermediary, and present the intermediaries and missing connections as an ordered set based on the connection criterion. According to various embodiments, the system receives a selection of a connection criterion from a first member and identifies a set of contact members. The system determines one or more contact members from the set of contact members and identifies a set of introduction members connected to the one or more contact members. The system determines one or more connected introduction members associated with the contact members. The system generates a contact order score for each contact member and causes presentation of the one or more contact members and the one or more connected introduction members based on the contact order scores.

13 Claims, 8 Drawing Sheets

NETWORK ANALYSIS SYSTEM

PRIORITY

This application claims the priority benefit of U.S. Provisional Application Ser. No. 62/382,114, entitled "NETWORK ANALYSIS SYSTEM" filed on Aug. 31, 2016 which is hereby incorporated by reference herein in its entirety.

TECHNICAL FIELD

The present disclosure generally relates to the technical field of network-based publication systems and, in one embodiment, to analyzing a social network using connection criterion to identify missing connections, facilitate establishing new connections by identifying an intermediary, and presenting the intermediaries and missing connections as an ordered set based on the connection criterion.

BACKGROUND

Network-based publication systems enable users to publish documents, pages, and other content. Users may access and view published content on the network-based publication system via a network linking the network-based publication system to a client device. A social networking system, such as LinkedIn, may allow members to declare information about themselves, such as their professional qualifications or skills. In addition to information the members declare about themselves, a social networking system may gather and track information pertaining to behaviors of members with respect to the social networking system and social networks of members of the social networking system. Analyzing a vast array of such information may help to come up with solutions to various problems that may not otherwise have clear solutions.

BRIEF DESCRIPTION OF THE SEVERAL VIEWS OF THE DRAWINGS

Some embodiments are illustrated by way of example and not limitation in the accompanying drawings, in which.

DETAILED DESCRIPTION

Example methods and systems for analyzing a social network to identify recommended connections based on a connection criterion are described. In some example embodiments, a first member of a social network selects a connection criterion presented on a user interface displayed on a computing device. A network analysis machine identifies potential contacts for the connection criterion. The potential contacts may be members of the social network with whom the first member previously had no connection. The network analysis machine identifies, from among the connections of the potential contacts, a set of introduction members and, from those introduction members, identifies connected introduction members associated or otherwise connected to the first member. The network analysis machine then presents an ordered list of the potential contacts along with the connected introduction members capable of bridging a connection gap between the first member and the potential contact.

Social networking services provide various profile options and services. In some instances, a social network may connect members (e.g., individuals associated with the social network) and organizations alike. Social networking services have also become a popular method of performing organizational research and job searching. Job listings representing openings (e.g., employment and volunteer positions) within an organization may be posted and administered by the organization or third parties (e.g., recruiters, employment agencies, etc.).

A social networking system may have a vast array of information pertaining to members of the social networking system, companies maintaining a social networking presence on the social networking system, and interactions between members, companies, and content provided by both the members and companies to the social networking system. As will be discussed in more detail below, information pertaining to members of the social networking system can include data items pertaining to education, work experience, skills, reputation, certifications, other qualifications of each of the members of the social networking system at particular points during the careers of these members, or interaction data indicating a history of interactions with content on the social networking system. This information pertaining to members of the social networking system may be member generated to enable individualization of social networking profiles as well as to enable dynamic and organic expansion and discovery of fields of experience, education, skills, and other information relating to personal and professional experiences of members of the social networking system.

Other aspects of the present inventive subject matter will be readily apparent from the description of the figures that follow.

Figure 1:
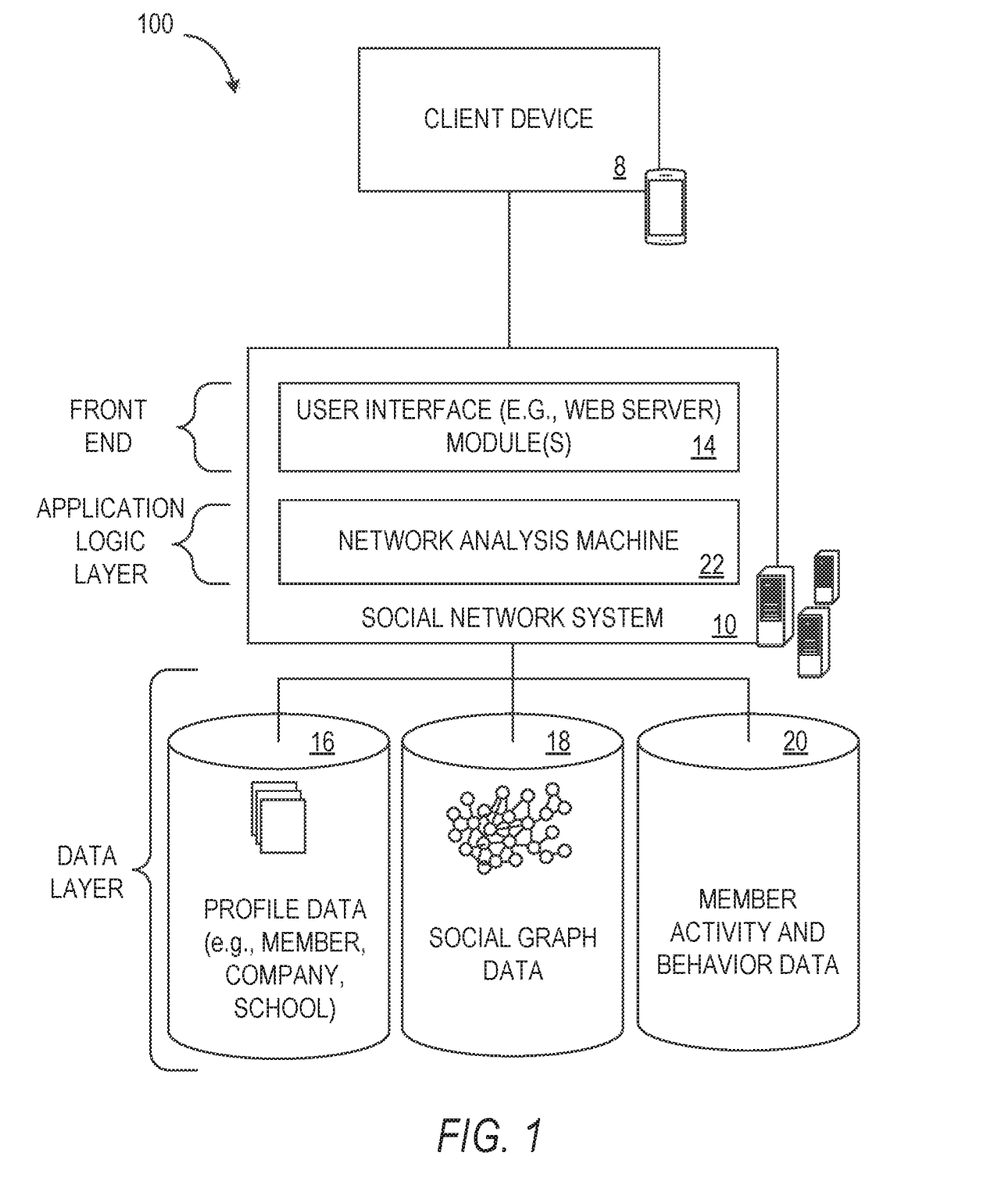
FIG. 1 is a block diagram of the functional components that comprise a computer-network based social network service, including a network analysis machine consistent with some embodiments described herein.

FIG. 1 is a block diagram 100 of the functional components that comprise a computer- or network-based social networking system 10 consistent with some embodiments of the inventive concepts of the present disclosure. In some embodiments, the social networking system 10 acts as a network-based publication system. In these instances, as shown in FIG. 1, the social networking system 10 is generally based on a three-tiered architecture, comprising a front end layer, application logic layer, and data layer. As is understood by skilled artisans in the relevant computer and Internet-related arts, each component or engine shown in FIG. 1 represents a set of executable software instructions (e.g., an instruction set executable by a processor) and the corresponding hardware (e.g., memory and processor) for executing the instructions. To avoid obscuring the inventive subject matter, various functional components and engines that are not germane to conveying an understanding of the inventive subject matter have been omitted from FIG. 1. However, a skilled artisan will readily recognize that various additional functional components and engines may be used with a social networking system 10, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end comprises a user interface component 14 (e.g., a web server), which receives requests from various client-computing devices 8, and communicates appropriate responses to the requesting client devices 8. For example, the user interface component 14 may receive requests in the form of Hypertext Transport Protocol (HTTP) requests, or other web-based, application programming interface (API) requests. The client devices 8 may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may use a bi-lateral agreement by the members, such that both members acknowledge the establishment of the connection. Similarly, with some embodiments, a member may elect to "follow" another member. In contrast to establishing a "connection," the concept of "following" another member typically is a unilateral operation and, at least with some embodiments, does not include acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments, a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph and, as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking components, which generally detect various member-related activities and/or events, and then store information relating to those activities/events in the database with reference number 20. For example, the tracking components may identify when a member makes a change to some attribute of his or her member profile, or adds a new attribute. Additionally, a tracking component may detect the interactions that a member has with different types of content. Such information may be used, for example, by one or more recommendation engines to tailor the content presented to a particular member, and generally to tailor the member experience for a particular member.

The application logic layer includes various application server components, which, in conjunction with the user interface component 14, generate various user interfaces (e.g., web pages) with data retrieved from various data sources in the data layer. With some embodiments, individual application server components are used to implement the functionality associated with various applications, services, and features of the social network service. For instance, a messaging application, such as an email application, an instant messaging application, a social networking application native to a mobile device, a social networking application installed on a mobile device, or some hybrid or variation of these, may be implemented with one or more application server components implemented as a combination of hardware and software elements. Of course, other applications or services may be separately embodied in their own application server components.

As shown in FIG. 1, a network analysis machine 22 is an example application server component of the social networking system 10. The network analysis machine 22 performs operations to automatically analyze a social network to identify recommended connections based on a connection criterion. In some embodiments, the network analysis machine 22 operates in conjunction with the user interface components 14 to receive sets of publication data, a set of selection criterion, a set of member data, and member input to generate tailored user interface presentations including tailored member search results. For example, the network analysis machine 22 may render graphical representations of result sets indicative of member profiles (e.g., sets of publication data) having specified connections and identified missing links.

The social networking system 10 may provide a broad range of applications and services that allow members the opportunity to share and receive information, often customized to the interests of the member. For example, with some embodiments, the social networking system 10 may include a photo sharing application that allows members to upload and share photos with other members or a slide sharing application, which allows members to upload slide decks for sharing among other members. With some embodiments, members of a social networking system 10 may be able to self-organize into groups, or interest groups, organized around a subject matter or topic of interest. Accordingly, the data for a group may be stored in a database (not shown). When a member joins a group, his or her membership in the group will be reflected in the social graph data stored in the database 18. With some embodiments, members may subscribe to or join groups affiliated with one or more companies. For instance, with some embodiments, members of the social networking system 10 may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database 18.

Figure 2:
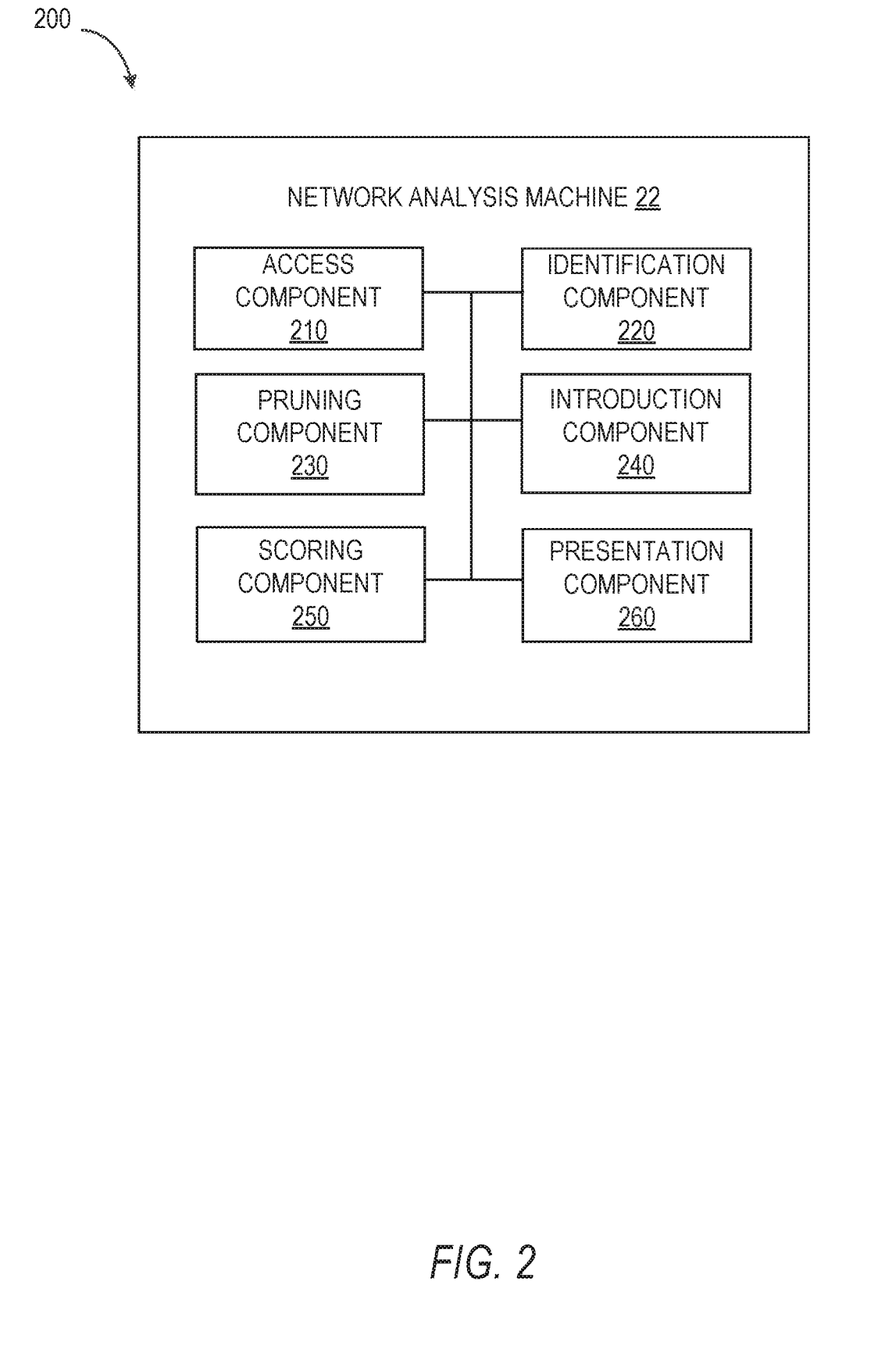
FIG. 2 is a block diagram depicting components of the network analysis machine of FIG. 1, in accordance with an example embodiment.

FIG. 2 is a block diagram depicting some example components of the network analysis machine 22 of FIG. 1. The network analysis machine 22 is shown including an access component 210, an identification component 220, a pruning component 230, an introduction component 240, a scoring component 250, and a presentation component 260, all configured to communicate with each other (e.g., via a bus, shared memory, a switch, or a network). Any one or more of the components described herein may be implemented using hardware (e.g., one or more processors specifically configured to perform the operations described herein) or a combination of hardware and software, forming a hardware-software implemented component. For example, any component described herein may configure a processor (e.g., among one or more processors of a machine) as a special purpose machine, during the pendency of a set of operations, to perform the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

The access component 210 receives or accesses a selection of a connection criterion. The access component may access the selection of the connection criterion by receiving an indication of the selection of a connection criterion from a graphical user interface. The selection may be performed by a user or member of the social network interacting with the graphical user interface on a computing device.

The identification component 220 identifies contact members in the social network. The contact members may be indicated as being responsible for interacting with an entity or a solution associated with the member selecting the connection criterion. In some embodiments, the identification component identifies contact members based on a connection with a company which, in turn, is associated with the entity or connection criterion. The identification component 220, alone or in combination with one or more other components, may parse various layers of the social network in order to determine or otherwise identify the contact members.

The pruning component 230 determines subsets of contact members from sets of contact members identified by the identification component 220. The pruning component may prune initial sets of contact members based on indicated relative health of relationships, member characteristics, member interactions, and other suitable criteria.

The introduction component 240 identifies introduction members of the social network. The introduction members bridge a connection gap between the member initiating selection of the contact criterion and the contact members. The introduction members may be identified based on the common connection between the contact member and the first member initiating the selection. The introduction component may also make determinations of introduction members based on regional preferences, locations, and other considerations described below.

The scoring component 250 generates scores for contact members and introduction members. When generating scores for contact members, the scoring component may consider interactions of the member, number of connections, types of connections, historical interactions, and other suitable characteristics in addition to a relationship between the contact member and the connection criterion. When generating scores for introduction members, the scoring component 250 may take into consideration connection levels between the first member and the introduction member, interaction history, number of contacts, similarity of contacts, and other suitable considerations.

The presentation component 260 causes presentation of the contact members and at least a portion of the introduction members to the first member. The presentation component 260 may cause a tailored presentation based on the scores generated by the scoring component 250. The tailored presentations may be rendered or otherwise presented within a dynamic graphical user interface configured to be modified by the presentation component 260. The presentation component 260 may modify aspects of the graphical user interface based on differences in scoring of the scoring component 250, connections among the identified members, and other considerations described below.

Figure 3:
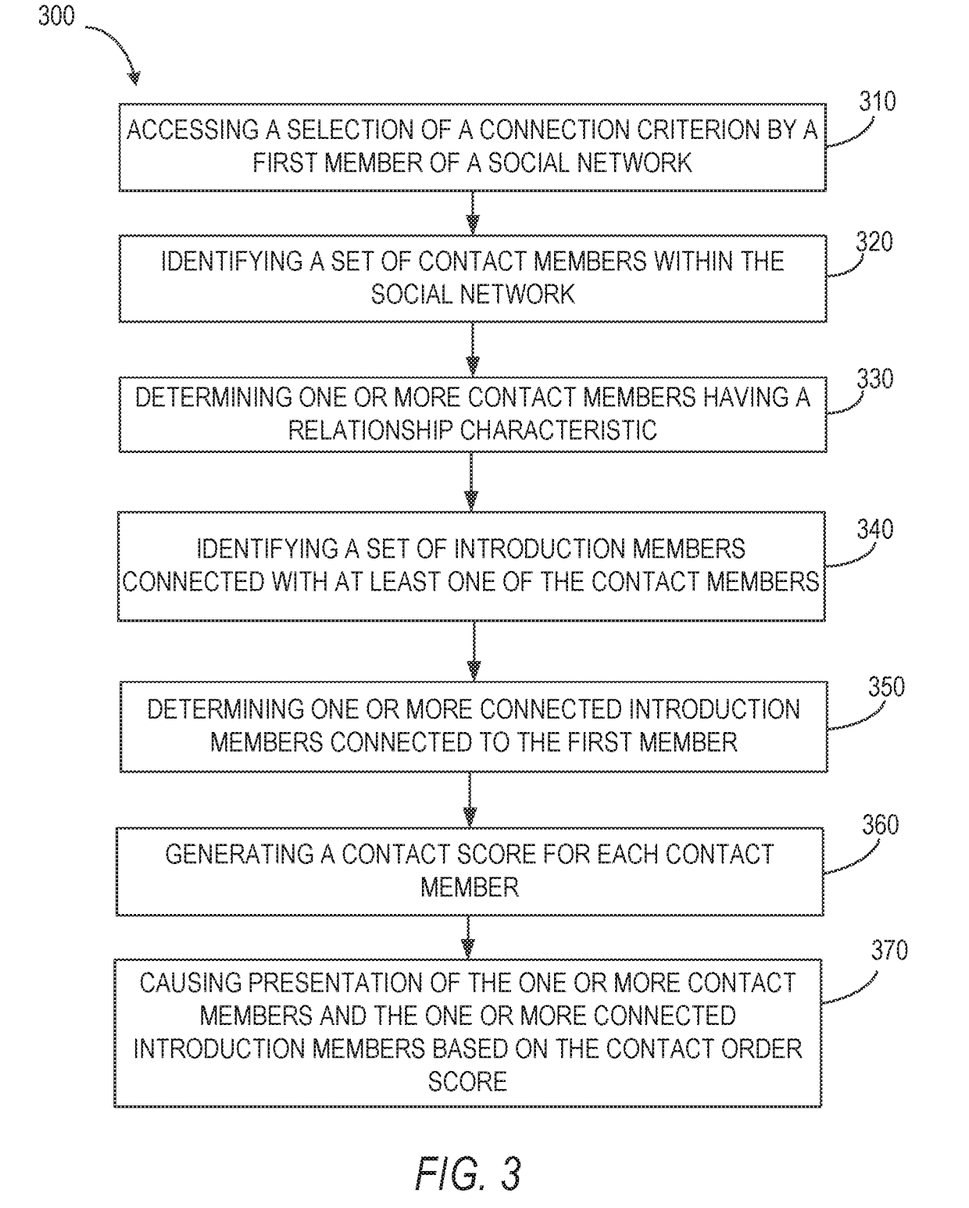
FIG. 3 is a flow diagram illustrating a method of analyzing a social network to identify recommended connections based on a connection criterion, according to some embodiments of the present disclosure.

FIG. 3 is a flow diagram illustrating an example method 300 of analyzing a social network to identify recommended connections based on a connection criterion, consistent with various embodiments described herein. The method 300 may be performed, at least in part, by, for example, the network analysis machine 22 illustrated in FIG. 2 (or an apparatus having similar components or operative programming, such as one or more client machines or application servers).

In operation 310, the access component 210 accesses or otherwise receives a selection of a connection criterion. The connection criterion may be associated with a first member of a social network. The social network may be associated, part of, or provided by a social networking system. The first member may be identified as associated with an entity. The entity may be a member or organization that forms a part or node within the social network. In some embodiments, the access component 210 receives a plurality of selections for a plurality of connection criteria. In these instances, each selection may be associated with a different connection criteria, solution, type, or classification of connection criteria.

In some embodiments, the connection criterion is a solution offered by the entity. The solution may be a product, software product, service, or any other solution, item, or action capable of being provided by the entity. In some instances, the product may be a specified product of a product family. The product available for selection as the connection criterion may be presented as a user interface element within a graphical user interface. The user interface element may be presented as a drop down menu including a plurality of selectable elements. Each selectable element represents a product of the product family. Although described as a drop down menu, it should be understood that the user interface element enabling selection of the connection criterion may be a radio button, a wheel menu, a text input field, or any other suitable user interface element capable of presenting or receiving selection or input of the connection criterion. Further, although described as a product, service, or other solution, it should be understood that the connection criterion may be a member characteristic, a skill, a job or position within an entity, or any other suitable criterion for generating a connection between members of a social network. In embodiments where the access component 210 receives a plurality of selections for a plurality of connection criteria, the selections may comprise two or more of a product, a service, a software product, a job function, a location, a skill, a seniority level, or any other suitable connection criteria.

In operation 320, the identification component 220 identifies, on a social network database of the social networking system, a set of contact members within the social network associated with the connection criterion. Contact members may be members of the social network indicated as responsible for interacting with, managing, or purchasing the solution at a company using the solution. The contact member may be a responsible party at the company, a managing member (e.g., a member capable of making purchasing decisions for the company), or any other suitable member having a direct association with the company.

In some embodiments, the identification component 220 identifies the association of the set of contact members and the connection criterion by determining one or more entities engaged with the solution. For example, the identification component 220 may identify a company purchasing a product, software product, service, or other solution from the entity associated with the first member. The identification component 220 may then identify members of the social network associated with the company as the set of contact members.

In operation 330, the pruning component 230 determines one or more contact members from the set of contact members. The one or more contact members may have a specified relationship characteristic indicating a relative health of an association between the entity and the one or more contact members. In some embodiments, the specified relationship may be determined based on a health score. For example, in one embodiment, the specified relationship is determined by the health score exceeding a health threshold. In some instances, the health threshold may be a predetermined threshold indicating a persistent minimum score for considering a relationship between a contact member and the entity to be healthy. The health threshold may also be a dynamic threshold. In one embodiment, the dynamic threshold is determined at one or more of a time of selecting the connection criterion or a time of identifying the set of contact members. The dynamic threshold may be determined based on health scores of the set of contact members, or any other suitable manner. As described in the above-referenced example, in some embodiments, the pruning component 230, uses the health threshold to selects contact members for inclusion in the one or more contact members. In such embodiments, the pruning component 230 selects contact members from the set of contact members based on a relative health of the association, between the entity and a contact member, having a health score above the health threshold.

The health score for a relationship between a given contact member and the entity may be determined using one or more score generation algorithms. In some embodiments, the health score is determined using a growth score and a churn score. The growth score and the churn score (e.g., scores or data underlying and used to generate the scores) may be combined using a predictive model generated to determine one or more relative risks associated with the contact member. In some instances, the growth score represents a determination of growth potential of an opportunity or business relationship existing between the entity and the given contact member. The growth score may be a representation or quantification of growth factors comprising related solutions (e.g., additional or extendable solutions related to a solution being used by the entity), payment history of the entity, communication frequency of the entity, length of relationship between the contact member and the entity, account characteristics of the entity, and other suitable growth or relationship factors. The churn score may be a representation of a relative risk level of an account of an entity. The churn score or churn rate may be determined by combining values for product usage, product performance, account characteristics of the entity, and a quantification of client outreach to the entity.

From the elements of the identified for the growth score and the churn score, a predictive model is generated. In some embodiments, the predictive model is one or more statistical models. The one or more statistical models may be implemented using different techniques. The techniques used to generate the statistical models may enable the predictive model to generate indications of churn risk, thresholds, churn risk levels, or risk factors. As such, the predictive model determines what accounts are under risk. In some instances, the predictive model is generated using one or more machine learning processes based on outcomes of relationships with one or more entities and the contact member or other contact members. For example, the one or more statistical models may be generated using gradient tree boosting techniques, decision trees, artificial neural networks. Bayesian networks, support vector machines, or clustering techniques. In some instances, certain techniques may be used to generate specified elements used by the prediction model. For example, the churn risk may be generated by gradient tree boosting, the risk factors may be generated or identified using additional decision trees. In some embodiments, the churn risk, thresholds, churn risk levels, and risk factors may be generated using the same statistical model instead of one or more separate statistical models.

In operation 340, the introduction component 240 identifies a set of introduction members of the social network. Introduction members may be members of the social network who share a connection with the first member and with at least one of the one or more contact members identified in operation 330. For example, in some embodiments, an introduction member may be a relationship manager for the entity. In one embodiment, the relationship manager is associated with the first member directly in the social network as a direct connection. Alternatively, and/or additionally, the relationship manager is associated with the first member via the entity as an intermediary. In these instances, the first member may be an account executive of the entity tasked with establishing or enhancing contacts with potential or existing clients. Where the introduction member is a relationship manager, the introduction member may be employed as a relationship manager for the entity. The common relationships of the first member and the introduction member with the entity may establish the connection between the first member and the introduction member.

In some embodiments, the introduction component 240 identifies the set of introduction members for at least a portion of the contact members of the one or more contact members determined in operation 330. Each one of the contact members of the portion of the contact members may be connected to at least one of the set of introduction members. In this way, each of the contact members has an avenue of introduction for the first member by way of an introduction member. In one embodiment, the connection between a contact member and an introduction member is represented by an edge extending between two nodes within a portion of the social network. In some instances, the connection is established between profiles of the connection member and the introduction member by linking profiles through selection of a user interface element presented within a user interface. Selection of the linking user interface element may establish or otherwise generate a metadata element modifying entries of the connection member profile and the introduction member profile to include the link and establish a connection between the two profiles.

In operation 350, the pruning component 230 determines one or more connected introduction members from the set of introduction members. The one or more connected introduction members may be connected to the first member within a portion of the social network. A connected introduction member may have a direct connection to the first member. In some embodiments, the direct connection is established through a linking, connecting, or other personal selection by one of the first member and the connected introduction member with the other. In some instances, the direct connection is established indirectly by respective associations between each member and the entity. For example, a job title or position of the first member as an account executive with the entity and a title or position of the connected introduction member as a relationship manager with the entity may establish the direct connection justifying identification of the connected introduction member.

In operation 360, the scoring component 250 generates a contact score for each one of the contact members of the one or more contact members. The contact score may be generated based on a first connection between the contact member and a connected introduction member of the one or more connected introduction members, a second connection between the connected introduction member and the first member, and the association between the contact member and the connection criterion. The scoring component 250 may take into consideration a number of similar contacts between the contact member and the connected introduction member or the first member, a number of historical interactions between the contact member and the entity or the connected introduction member, a number of contacts of the contact member, and a number of contacts of the contact member similar to the first member or the connected introduction member.

In some embodiments, the contact score may be generated in a manner similar to or the same as the health score described above. The contact score may represent the health score between an entity and a given contact member or contact members and include a prioritization score. The prioritization score may be generated through a priority matrix indicating relative risks of churn rates and relative growth rates for entities. The contact score may enable contact members or introduction members to prioritize entity relationships having relatively lower churn rates and relatively higher growth rates. The contact scores and prioritization matrix may be generated by the scoring component 250, automatically, using the predictive model learned from past outcomes of entity relationships.

In operation 370, the presentation component 260 causes presentation of the one or more contact members and the one or more connected introduction members based on the contact score determined for each one of the contact members of the one or more contact members. In some example embodiments, the presentation component 260 causes presentation of at least one contact member associated with each connected introduction member of the one or more connected introduction members. The one or more contact members and the one or more connected introduction members may be presented within a graphical user interface. In some instances, the contact members and the connected introduction members are presented using user interface elements representing member profiles of the social network. The user interface elements representing the member profiles may be links, rendered data (e.g., contact information), or any other suitable representation.

In some embodiments, prior to presenting the one or more contact members, the identification component 220 determines one or more connection criterion associated with each contact member of the one or more contact members and associated with the connection criterion selected by the first member. Upon determining the one or more associated connection criteria, the presentation component 260 causes presentation of the one or more associated connection criterion associated with each contact member. For example, the connection criteria may include a country, an industry, a role, a function, a company, a solution, a churn risk, and any other suitable connection criterion. The one or more connection criteria may be selected from the above-referenced group of criteria and may be presented as user interface elements within the graphical user interface for the network analysis machine 22.

In some embodiments, the presentation component 260 generates at least a portion of a message addressed to a specified connected introduction member for introduction to a contact member associated with the specified connected introduction member. The presentation component 260 may generate the portion of the message based on causing presentation of the one or more contact members and the one or more connected introduction members, as described in operation 370.

Figure 4:
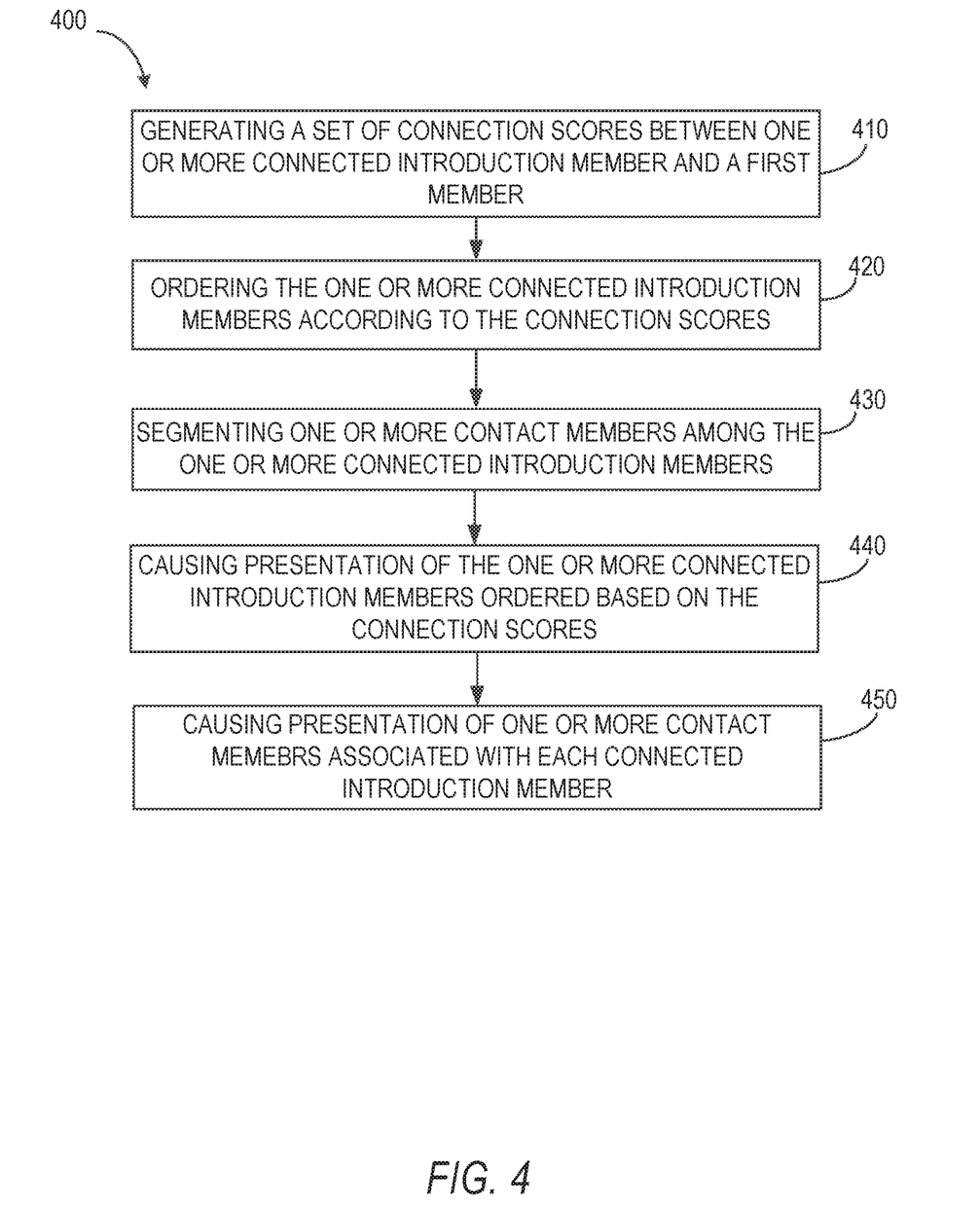
FIG. 4 is a flow diagram illustrating a method of analyzing a social network to identify recommended connections based on a connection criterion, according to some embodiments of the present disclosure.

FIG. 4 is a flow diagram illustrating a method 400 of analyzing a social network to identify recommended connections based on a connection criterion, consistent with various embodiments described herein. The method 400 may be performed, at least in part, by, for example, the network analysis machine 22 illustrated in FIG. 2 (or an apparatus having similar components, such as one or more client machines or application servers). In some embodiments, the method 400 includes one or more operations from the method 300. In some instances, the method 400 is performed as a sub-operation or other part of operation 370.

In operation 410, the scoring component 250 generates a set of connection scores quantifying the connection between the one or more connected introduction members and the first member. The connection score may be generated based on the connection being a first, second, or third level connection, a number of similar contacts or connections, a number or type of similar interactions (e.g., a history of interactions, favorited or liked articles), and other aspects affecting or reflecting similarity of connections. In some embodiments, the connection scores quantify the connection of the introduction members and the first member by identifying relevant connected members. Using the data supplied for generating the growth scores and churn scores, the scoring component 250 scores or otherwise identifies connected members having stronger relationships (e.g., less risk of churn and higher growth potential) and a stronger number of mutual connections to the first member. In some instances, the scoring component 250 incorporates a quantification of the similarity of solutions offered by the first member and solutions used by the entity.

In operation 420, the presentation component 260 orders the one or more connected introduction members according to the set of connection scores. The connected introduction members may be ordered in descending order of connection score such that connected introduction members with which the first member has a stronger connection are presented in a prioritized position (e.g., first among a list). In some instances, the order may be subservient to a connection score determined between a contact member and a connected introduction member, such that the first presented connected introduction member has a stronger connection to the contact member with whom the first member is recommended to interact.

In operation 430, the presentation component 260 segments the one or more contact members among the one or more connected introduction members. In these embodiments, the presentation component 260 divides the one or more contact members between the one or more connected introduction members such that each associated contact member and connected introduction member are partitioned to indicate the association.

In operation 440, the presentation component 260 causes presentation of the one or more connected introduction members ordered based on the set of connection scores. In some embodiments, member profiles of the social network that represent the connected introduction members are presented at an initial hierarchical level. The member profiles may be presented as links (a selection of which directs the first member to a network location of the member profile within the social network), user interface elements, selectable user interface elements, rendered text, or any other suitable representation. In some instances, where the member profiles are presented as selectable user interface elements, selection of the member profile may cause presentation of at least one contact member associated with the connected introduction member.

In operation 450, for each connected introduction member of the one or more connected introduction members, the presentation component 260 causes presentation of the one or more contact members associated with the connected introduction member. In some embodiments, the one or more contact members are ordered according to the contact scores, in a manner similar to that described in operations 360 and 370. The one or more contact members associated with each connected introduction member may be presented as a second hierarchical level subordinate to the initial hierarchical level. In some instances, the one or more contact members may be presented upon selection of user interface elements representing the connected introduction members. The one or more contact members may also be presented simultaneously with the one or more connected introduction members.

Figure 5:
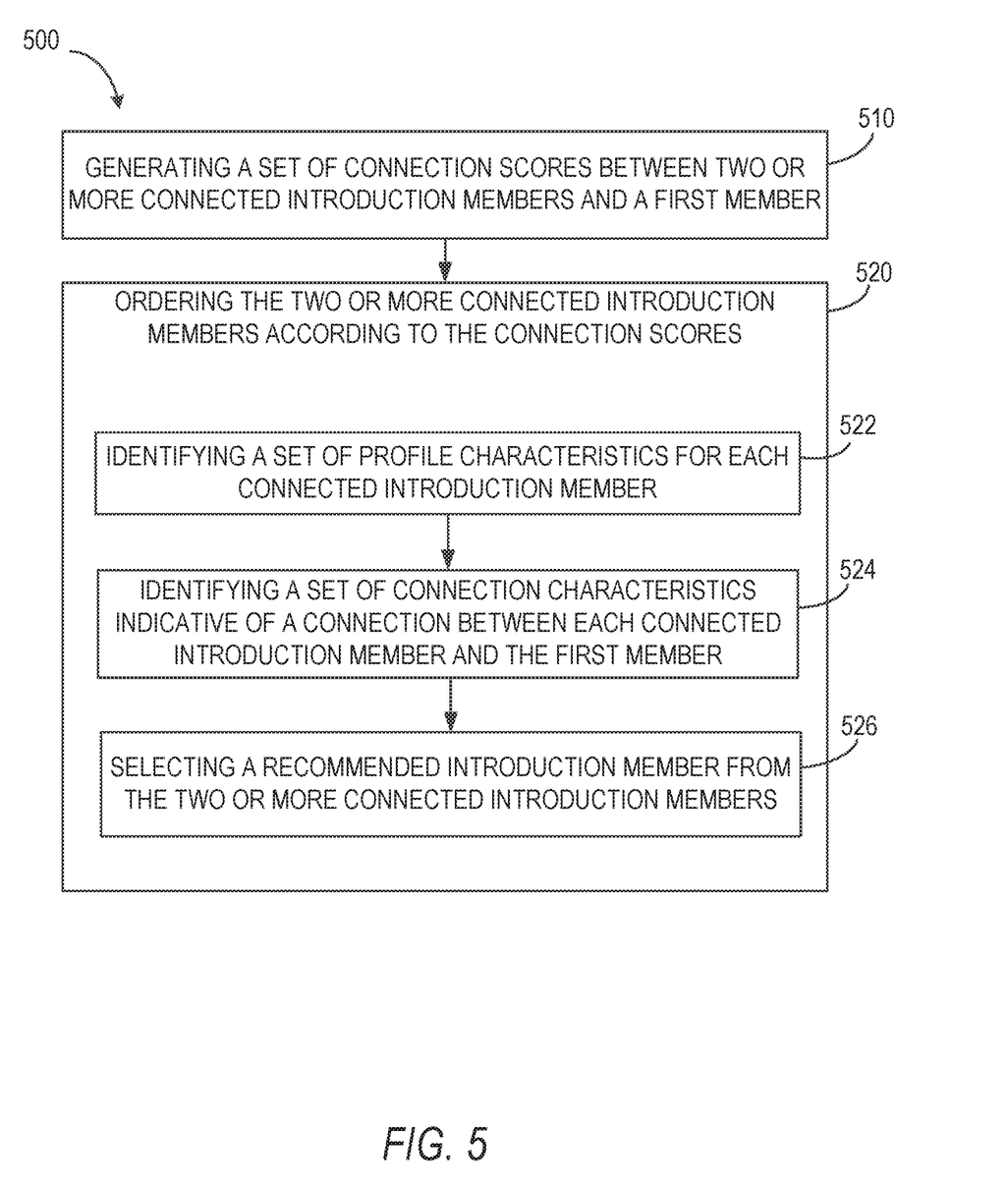
FIG. 5 is a flow diagram illustrating a method of analyzing a social network to identify recommended connections based on a connection criterion, according to some embodiments of the present disclosure.

FIG. 5 is a flow diagram illustrating an example method 500 of analyzing a social network to identify recommended connections based on a connection criterion, consistent with various embodiments described herein. The method 500 may be performed, at least in part, by, for example, the network analysis machine 22 illustrated in FIG. 2 (or an apparatus having similar components, such as one or more client devices 8 or application servers). In some embodiments, the method 500 is performed as a sub-operation or other part of operation 370.

In operation 510, the scoring component 250 generates a set of connection scores quantifying the connection between the two or more connected introduction members and the first member. The set of connection scores may be generated similarly to or the same as those generated in operation 410.

In operation 520, the presentation component 260 orders the two or more connected introduction members according to the set of connection scores. In some embodiments, the presentation component 260 may order the two or more connected introduction members similarly to the manner described with respect to operation 420.

In operation 522, the presentation component 260 identifies a set of profile characteristics indicative of a member profile of each connected introduction member of the two or more connected introduction members. The profile characteristics may include skills, interaction histories, job titles, job functions, seniority, and other suitable profile characteristics. In some instances, each of the profile characteristics may be assigned a value for comparison of the connection characteristics of the two or more connected introduction members and the first member.

In operation 524, the presentation component 260 identifies a set of connection characteristics indicative of the connection between each of the two or more connected introduction members from the two or more connected introduction members and the first member. The connection characteristics can include hierarchical levels of connections, types of connections, numbers of similar connections, and other suitable connection characteristics. In some instances, each of the connection characteristics may be assigned a value for comparison of the connection characteristics of the two or more connected introduction members and the first member.

In operation 526, the presentation component 260 selects a recommended introduction member from the two or more connected introduction members. Selecting the recommended introduction member may be based on the set of profile characteristics and the set of connection characteristics. In some embodiments, the recommended introduction member may be placed in a priority position in an ordered list of the two or more connected introduction members. The recommended introduction member may be positioned outside of the ordered list of two or more connected introduction members. For example, and in one embodiment, the recommended introduction member may be positioned in a portion of the graphical user interface indicating a recommended status.

Figure 6:
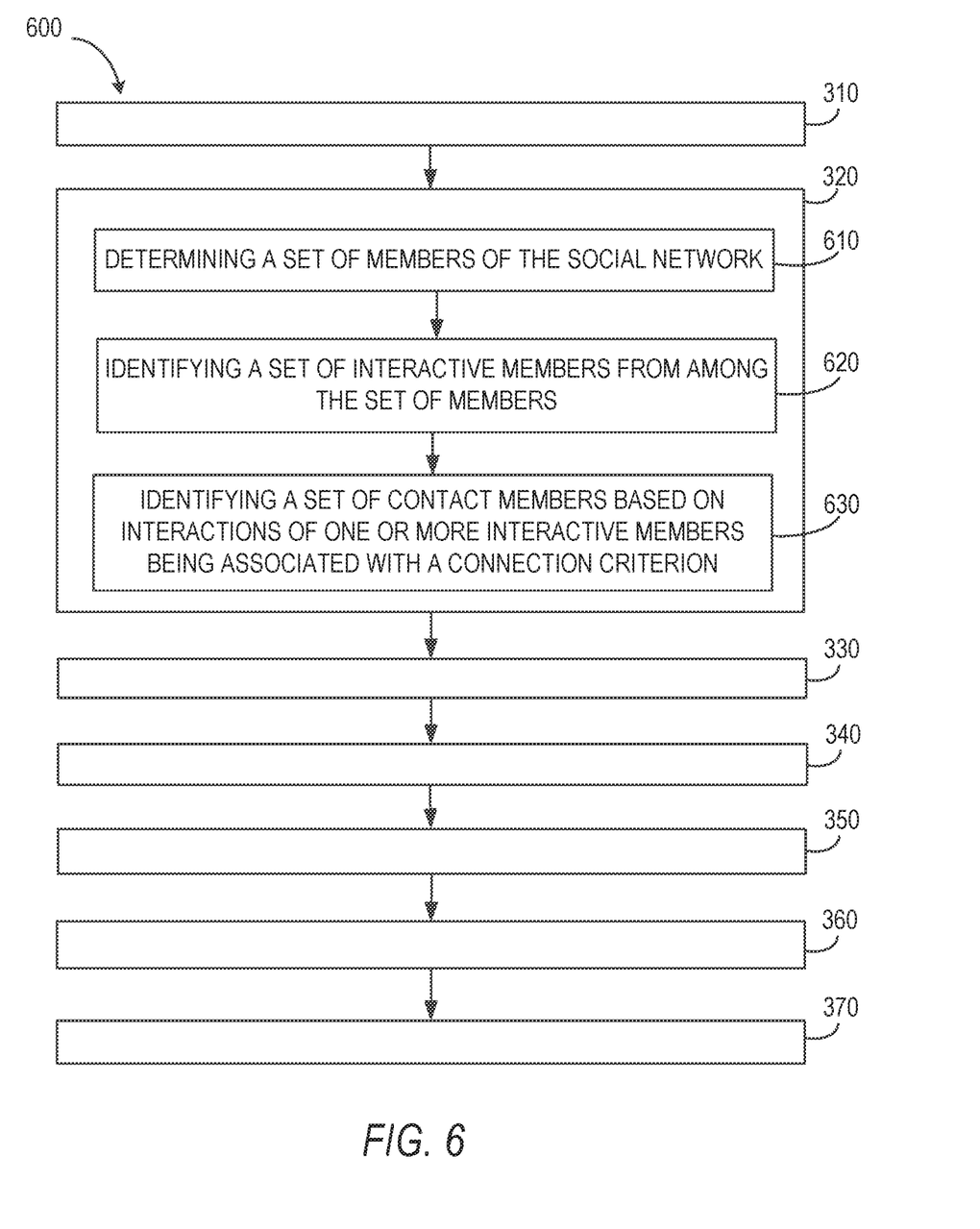
FIG. 6 is a flow diagram illustrating a method of analyzing a social network to identify recommended connections based on a connection criterion, according to some embodiments of the present disclosure.

FIG. 6 is a flow diagram illustrating an example method 600 of analyzing a social network to identify recommended connections based on a connection criterion, consistent with various embodiments described herein. The method 600 may be performed, at least in part, by, for example, the network analysis machine 22 illustrated in FIG. 2 (or an apparatus having similar components, such as one or more client machines or application servers). In some embodiments, the method 600 includes one or more operations from the methods 300, 400, or 500. For example, the method 600 may include operation 310. The operations of the method 600 may be performed during or as a set of sub-operations of operation 320.

In operation 610, the identification component 220 determines a set of members of the social network within the social network database. The identification component 220 may initially determine the set of members of the social network as the entire membership of the social network. In some embodiments, the identification component 220 operates in conjunction with the pruning component 230 to remove from the set of members those members that are directly connected to the entity to generate the set of members for further pruning. In some instances, the pruning component 230 removes inactive members of the social network having no interactions or interactions below a specified threshold within a period of time prior to the determination of the set of members.

In operation 620, the pruning component 230 identifies, from among the set of members of the social network, a set of interactive members. The set of interactive members may be identified based on one or more interactions with the entity. In some embodiments, the set of interactive members have interactions with the entity representing purchases of, trials of, or interactions with one or more solutions, products, software products, services, or other solutions provided by the entity. In some instances, members may be identified as interactive members where the member is associated with a company having interactions with one or more solutions of the entity. In some instances, members determined to be interactive members based on an association with a company are selected based on a combination of the company interaction, the association with the company, and a member characteristic indicating a responsibility associated with the solution. For example, the member may be included as an interactive member where the member is a product manager, a purchasing manager, or any other individual having responsibility over directing interactions with the entity or solution.

In operation 630, from the set of interactive members, the identification component 220 identifies the set of contact members based on the one or more interactions as being associated with the connection criterion. In some embodiments, the set of contact members are pruned from the set of interactive members by determining that one or more of the interactive members interact with or purchase a solution of the connection criterion or are responsible for the company interacting with the solution. The set of contact members may also be selected from the interactive members where the contact members interact with or are responsible for the company interacting with a solution that is similar to or related to the solution received in operation 310. For example, a solution, product, software product, or service may be determined to be similar to the solution of operation 310 where the solution, product, software product, or service is within a family, hierarchical, or other relationship with the solution selected in operation 310.

Figure 7:
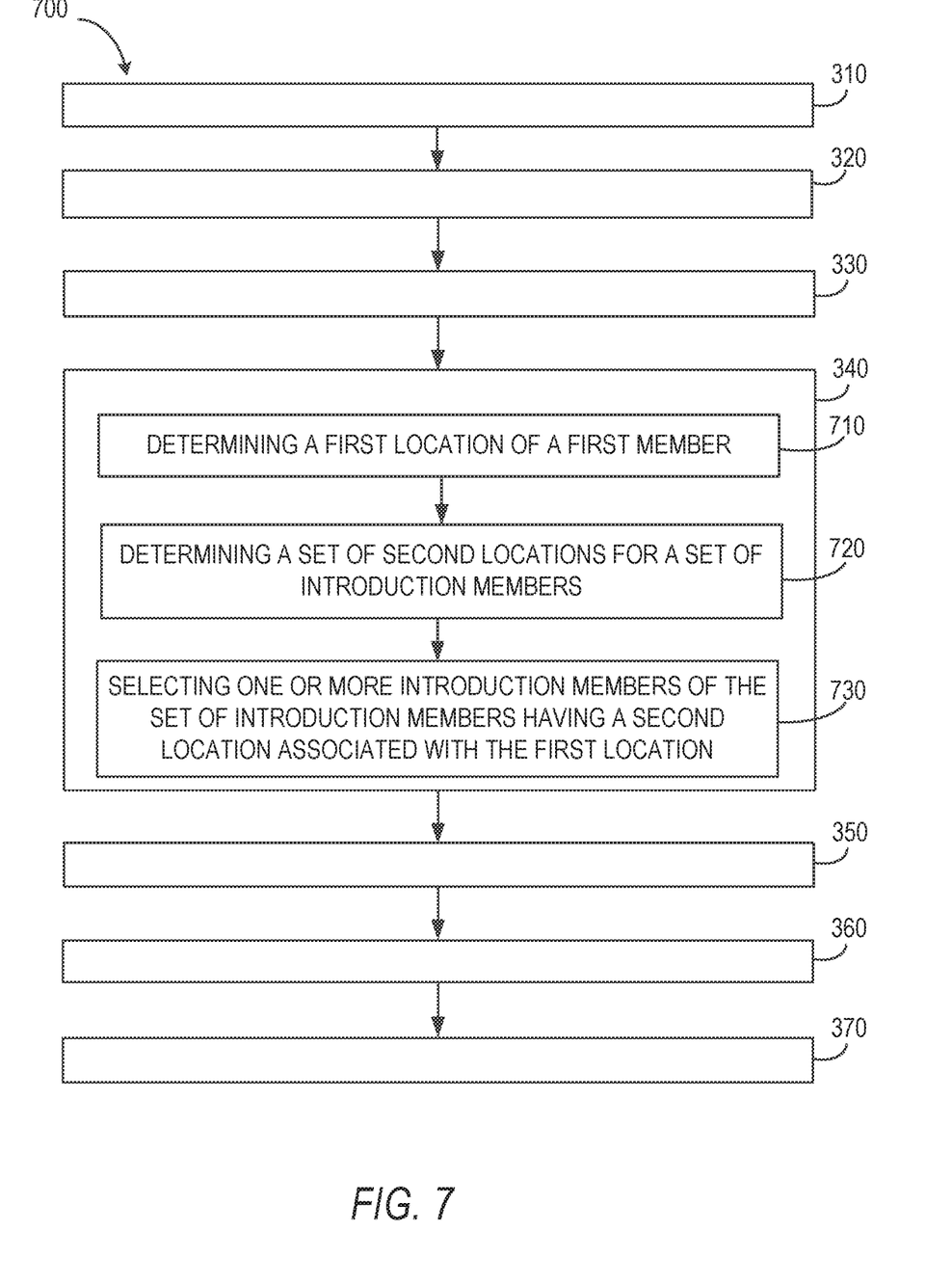
FIG. 7 is a flow diagram illustrating a method of analyzing a social network to identify recommended connections based on a connection criterion, according to some embodiments of the present disclosure.

FIG. 7 is a flow diagram illustrating an example method 700 of analyzing a social network to identify recommended connections based on a connection criterion, consistent with various embodiments described herein. The method 700 may be performed, at least in part, by, for example, the network analysis machine 22 illustrated in FIG. 2 (or an apparatus having similar components, such as one or more client machines or application servers). In some embodiments, the method 700 includes one or more operations from the methods 300, 400, 500, or 600. For example, the method 700 may be performed as part of or a set of sub-operations of operation 340.

In operation 710, the introduction component 240 determines a first location of the first member. The first location may be a physical location, a geographical location, a region, a state, a country, or any other suitable location.

In operation 720, the introduction component 240 determines a set of second locations for the set of introduction members. The set of second locations may include physical locations, geographical locations, regions, states, countries, or any other suitable locations. In some embodiments, the introduction component 240 determines a second location for each introduction member of the set of introduction members.

In operation 730, the introduction component 240 selects one or more introduction members of the set of introduction members having a second location associated with the first location. In some instances, the selection of the one or more introduction members is based on one or more location criteria. The location criteria may be a physical proximity of the first location and the second location, an overlap of the first location and the second location, a location threshold based on a maximal distance, a time zone threshold identifying a maximal time zone difference between locations, or any other suitable location criteria.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented components or objects that operate to perform one or more operations or functions. The components and objects referred to herein may, in some example embodiments, comprise processor-implemented components and/or objects.

Similarly, the methods described herein may be at least partially processor-implemented. For example, at least some of the operations of a method may be performed by one or more processors or processor-implemented components. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

Figure 8:
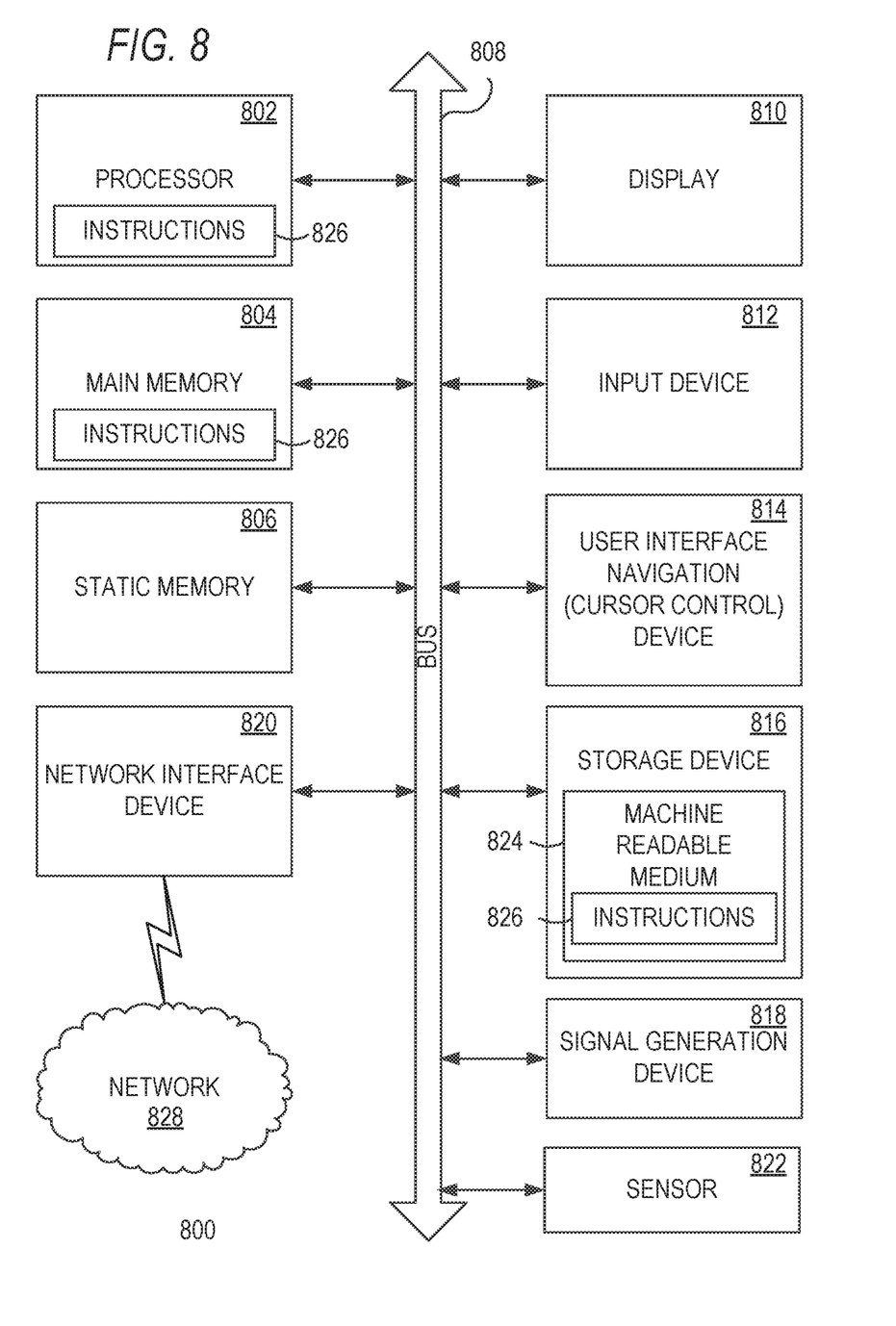
FIG. 8 is a block diagram of a machine in the form of a computing device within which a set of instructions, for causing the machine to perform any one or more of the methodologies discussed herein, may be executed.

FIG. 8 is a block diagram of a machine in the form of a computing device within which a set of instructions, for causing the machine to perform any one or more of the methodologies discussed herein, may be executed. For example, the computing device may be a server functioning as the network analysis machine 22. In some instances, the computing device may be a set of similar computing devices storing instructions capable of configuring a processor of the computing device as one or more of the components (hardware-software implemented components) described above. The configuration of a component, even for a period of time, causes the computing device to act as a special purpose computing device for performing one or more operations associated with the component, as described in the present disclosure. In some embodiments, the computing device may function as the social networking system 10 with portions (e.g., hardware and instructions) partitioned to function as one or more of the components, interfaces, or systems described above during specified operations associated with those aspects of the components, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a various embodiments, the machine will be a server computer, however, in alternative embodiments, the machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a display unit 810, an alphanumeric input device 812 (e.g., a keyboard), and a user interface (UI) navigation device 814 (e.g., a mouse). In one embodiment, the display, input device, and cursor control device are a touch screen display. The computer system 800 may additionally include a storage device 816 (e.g., drive unit), a signal generation device 818 (e.g., a speaker), a network interface device 820, and one or more sensors 822, such as a global positioning system sensor, compass, accelerometer, or other sensor.

The storage device 816 includes a machine-readable medium 824 on which is stored one or more sets of instructions and data structures (e.g., software 826) embodying or utilized by any one or more of the methodologies or functions described herein. The software 826 (e.g. processor executable instructions) may also reside, completely or at least partially, within the main memory 804 (e.g., non-transitory machine-readable storage medium) and/or within the processor 802 during execution thereof by the computer system 800, with the main memory 804 and the processor 802 also constituting machine-readable media 824.

While the machine-readable medium 824 is illustrated in an example embodiment to be a single medium, the term "machine-readable medium" may include a single medium or multiple media (e.g., a centralized or distributed database, and/or associated caches and servers) that store the one or more instructions 826. The term "machine-readable medium" shall also be taken to include any tangible medium that is capable of storing, encoding or carrying instructions 826 for execution by the machine and that cause the machine to perform any one or more of the methodologies of the present disclosure, or that is capable of storing, encoding or carrying data structures utilized by or associated with such instructions 826. The term "machine-readable medium" shall accordingly be taken to include, but not be limited to, solid-state memories, and optical and magnetic media. Specific examples of machine-readable media 824 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The software 826 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi® and WiMax® networks). The term "transmission medium" shall be taken to include any intangible medium that is capable of storing, encoding or carrying instructions 826 for execution by the machine, and includes digital or analog communications signals or other intangible medium to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:

maintaining social graph data in a social network database, the social graph data representing relationships between member profiles representing members in a social network system;

based on a connection criterion associated with a first member represented by a first member profile in the social networking system, the first member being identified as associated with an entity, identifying contact members represented by respective member profiles in the social network system, wherein the social graph data indicating absence of direct connection between any member from the contact members and the first member, each of the contact members associated with the connection criterion;

determining a subset of the contact members having a specified relationship characteristic indicating an association, reflected in the social graph data, between the entity and the subset of the contact members;

for one or more members in the subset of the contact members, identifying one or more connected introduction members represented in the social graph data as directly connected to a contact member from the set of the contact members and to the first member;

generating connection scores for the one or more connected introduction members, the connection scores quantifying respective connections between the respective one or more connected introduction members and the first member;

generating contact scores for members in the subset of the contact members, the contact scores generated based on a first connection between a contact member from the subset of the contact members and an introduction member from the one or more connected introduction members, a second connection between the introduction member and the first member, and the association between the contact member and the connection criterion; and causing presentation of the one or more members in the subset of the contact members and one or more of the connected introduction members within a graphical user interface, the presentation of the subset of the contact members in an order generated according to the contact scores, the presentation of the one or more of the connected introduction members in an order generated according to the connection scores, each member from the one or more connected introduction members presented as associated with at least one member from the subset of the contact members.

2. The method of claim 1, wherein identifying the contact members further comprises:

identifying, from among the members of the social network, a set of interactive members, wherein the interactive members identified based on one or more interactions with the entity; and identifying, from the set of interactive members, the contact members based on the one or more interactions being associated with the connection criterion.

3. The method of claim 1, wherein identifying the one or more connected introduction members further comprises determining a first location of the first member, wherein the one or more connected introduction members having a second location associated with the first location.

4. The method of claim 1, wherein two or more connected introduction members of the connected introduction members are connected to the first member and a specified contact member from the one or more connected introduction members, the method further comprises:

identifying a set of profile characteristics indicative of a member profile of each connected introduction member of the two or more connected introduction members;

identifying a set of connection characteristics indicative of the connection between each of the two or more connected introduction members and the first member; and selecting a recommended introduction member from the two or more connected introduction members based on the set of profile characteristics and the set of connection characteristics.

5. The method of claim 1, further comprising:

generating a message addressed to a specified connected introduction member from the one or more connected introduction members for introduction to a contact member from the subset of the contact members associated with the specified connected introduction member.

6. The method of claim 1, wherein causing presentation of the one or more members in the subset of the contact members further comprises:

determining one or more connection criterion associated with each contact member of the one or more members in the subset of the contact members and associated with the connection criterion selected by the first member; and causing presentation of the one or more connection criterion.

7. A system, comprising:

one or more processors; and a non-transitory processor-readable storage medium comprising processor executable instructions that, when executed by the one or more processors, causes the one or more processors to perform operations comprising:

maintaining social graph data in a social network database, the social graph data representing relationships between member profiles representing members in a social network system;

based on a connection criterion associated with a first member represented by a first member profile in the social networking system, the first member being identified as associated with an entity, identifying contact members represented by respective member profiles in the social network system, wherein the social graph data indicating absence of direct connection between any member from the contact members and the first member, each of the contact members associated with the connection criterion;

determining a subset of the contact members having a specified relationship characteristic indicating an association, reflected in the social graph data, between the entity and the subset of the contact members;

for one or more members in the subset of the contact members, identifying one or more connected introduction members represented in the social graph data as directly connected to a contact member from the set of the contact members and to the first member;

generating connection scores for the one or more connected introduction members, the connection scores quantifying respective connections between the respective one or more connected introduction members and the first member;

generating contact scores for members in the subset of the contact members, the contact scores generated based on a first connection between a contact member from the subset of the contact members and an introduction member from the one or more connected introduction members, a second connection between the introduction member and the first member, and the association between the contact member and the connection criterion; and causing presentation of the one or more members in the subset of the contact members and one or more of the connected introduction members within a graphical user interface, the presentation of the subset of the contact members in an order generated according to the contact scores, the presentation of the one or more of the connected introduction members in an order generated according to the connection scores, each member from the one or more connected introduction members presented as associated with at least one member from the subset of the contact members.

8. The system of claim 7, wherein identifying the contact members further comprises:
   identifying, from among the members of the social network, a set of interactive members, wherein the interactive members identified based on one or more interactions with the entity; and
   identifying, from the set of interactive members, the contact members based on the one or more interactions being associated with the connection criterion.

9. The system of claim 7, wherein identifying the one or more connected introduction members further comprises determining a first location of the first member, wherein
   the one or more connected introduction members having a second location associated with the first location.

10. The system of claim 7, wherein two or more connected introduction members of the connected introduction members are connected to the first member and a specified contact member from the one or more connected introduction members, the method further comprises:
    identifying a set of profile characteristics indicative of a member profile of each connected introduction member of the two or more connected introduction members;
    identifying a set of connection characteristics indicative of the connection between each of the two or more connected introduction members and the first member; and
    selecting a recommended introduction member from the two or more connected introduction members based on the set of profile characteristics and the set of connection characteristics.

11. A processor-readable storage device comprising processor executable instructions that, when executed by one or more processors, causes the one or more processors to perform operations comprising:
    maintaining social graph data in a social network database, the social graph data representing relationships between member profiles representing members in a social network system;
    based on a connection criterion associated with a first member represented by a first member profile in the social networking system, the first member being identified as associated with an entity, identifying contact members represented by respective member profiles in the social network system, wherein the social graph data indicating absence of direct connection between any member from the contact members and the first member, each of the contact members associated with the connection criterion;
    determining a subset of the contact members having a specified relationship characteristic indicating an association, reflected in the social graph data, between the entity and the subset of the contact members;
    for one or more members in the subset of the contact members, identifying one or more connected introduction members represented in the social graph data as directly connected to a contact member from the set of the contact members and to the first member;
    generating connection scores for the one or more connected introduction members, the connection scores quantifying respective connections between the respective one or more connected introduction members and the first member;
    generating contact scores for members in the subset of the contact members, the contact scores generated based on a first connection between a contact member from the subset of the contact members and an introduction member from the one or more connected introduction members, a second connection between the introduction member and the first member, and the association between the contact member and the connection criterion; and
    causing presentation of the one or more members in the subset of the contact members and one or more of the connected introduction members within a graphical user interface, the presentation of the subset of the contact members in an order generated according to the contact scores, the presentation of the one or more of the connected introduction members in an order generated according to the connection scores, each member from the one or more connected introduction members presented as associated with at least one member from the subset of the contact members.

12. The processor-readable storage device of claim 11, wherein identifying the contact members further comprises:
    identifying, from among the members of the social network, a set of interactive members, wherein the interactive members identified based on one or more interactions with the entity; and
    identifying, from the set of interactive members, the contact members based on the one or more interactions being associated with the connection criterion.

13. The processor-readable storage device of claim 11, wherein identifying the one or more connected introduction members further comprises determining a first location of the first member, wherein the one or more connected introduction members having a second location associated with the first location.

* * * * *